May 28, 1957 F. HUNSTIGER ET AL 2,793,515
CLUTCH
Filed May 20, 1955 2 Sheets-Sheet 1
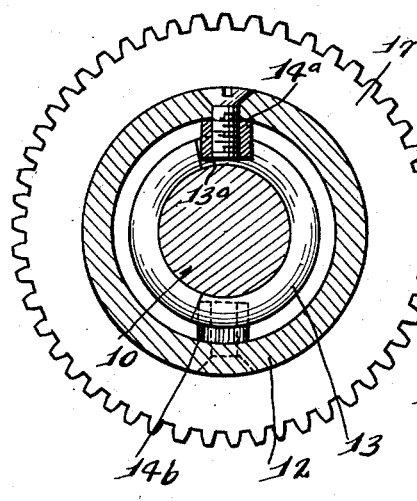
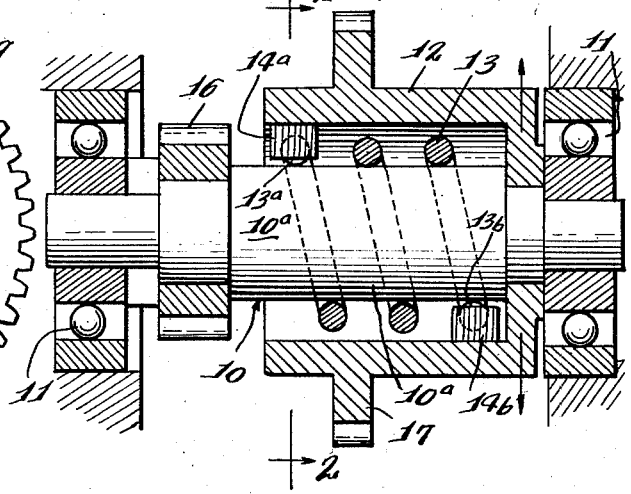
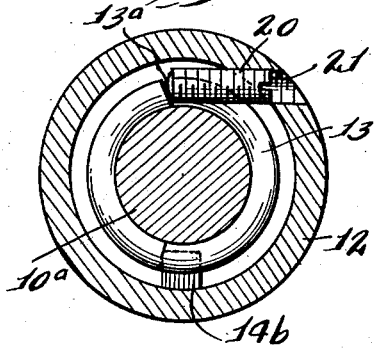
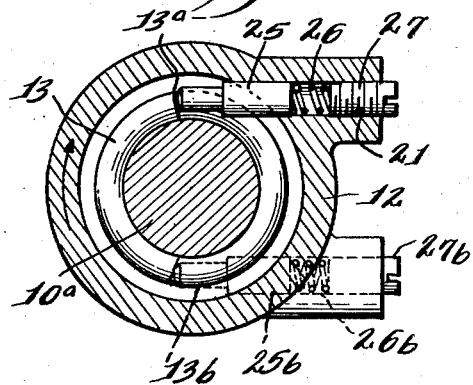
Inventors.
Francis Hunstiger.
Werner F. Massmann.
By Schroeder, Hofgren, Brady, Wegner,
Attorneys.

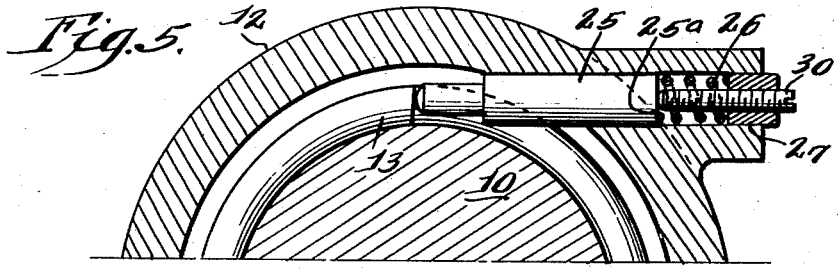
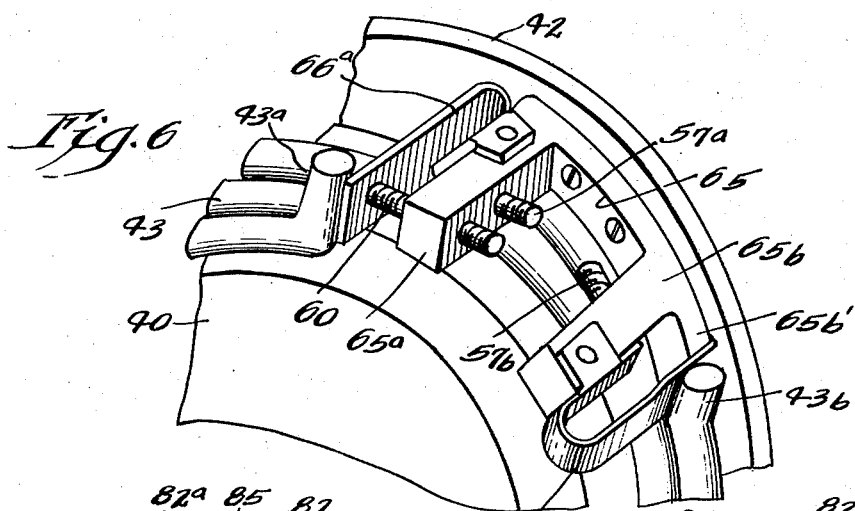
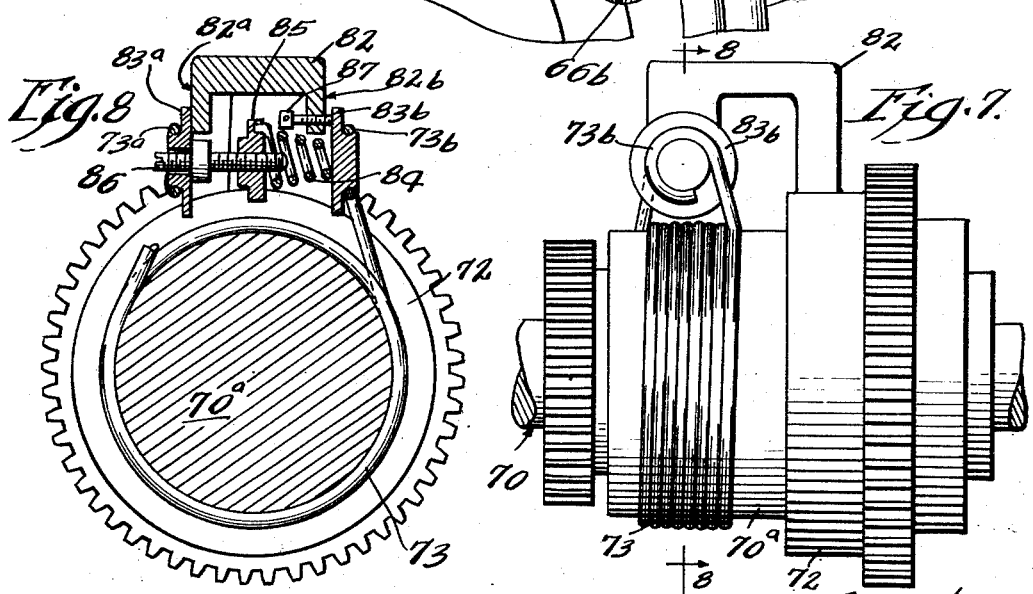

United States Patent Office 2,793,515
Patented May 28, 1957

2,793,515
CLUTCH

Francis Hunstiger, Chicago, and Werner F. Massmann, Lemont, Ill., assignors to Ampatco Laboratories Corporation, a corporation of Delaware Application May 20, 1955, Serial No. 509,723

3 Claims. (Cl. 64—30)

This invention relates to a clutch and more particularly to a slip clutch.

Simple slip clutches which have been used in the past have had several disadvantages which render them unsuitable for many applications. For example, in a clutch where two discs are held together in frictional contact the amount of torque necessary to cause slippage, sometimes referred to as the "limit torque," is dependent on a number of factors which are difficult to control, such as the temperature, the amount and type of lubrication on the engaging surfaces and the direction in which the clutch is turned. While it is possible to correct at least some of these faults by using complicated mechanical structures, such clutches are not only expensive but take up a great amount of space and are thus ill suited for many applications, as in aircraft where size and weight are an important consideration.

It is a principal object of this invention to provide a novel slip clutch of small size and of simple construction in which the limit torque is not affected by external physical conditions and is the same in both directions.

One feature of the invention is the provision of a slip clutch comprising first and second rotatable members, a coil spring in radially stressed engagement with one of the members and means on the other of said members adapted for driving engagemnt with said spring, the application of torque to one of the members in either direction causing a reduction in the radial force exerted by the spring on the first member. Another feature is that there are means on the other of the rotatable members adapted for driving engagement with an end portion of the spring. A further feature is that means are provided for adjusting the radial stress of the coil spring. Still another feature is that the stress varying means includes a resilient element and stop means are provided for preventing relative movement between the other member and the spring.

Still a further feature is that the clutch comprises a first rotatable member having a portion with a circular cylindrical surface, a second rotatable member concentric with the first, a coil spring in radially stressed engagement with the cylindrical portion of the first member and having two end surfaces, and means on the second member adapted for driving engagement with the end surfaces of the coil spring.

Further features and advantages will readily be apparent from the following specification and from the drawings, in which:

Figure 1 is a longitudinal section view of an embodiment of the invention;

Figure 2 is a transverse sectional view taken substantially along the line 2—2 of Figure 1;

Figure 3 is a transverse sectional view of a modified clutch;

Figure 4 is a transverse sectional view showing further modifications of the clutch;

Figure 5 is a fragmentary sectional view showing still further modifications of the clutch;

Figure 6 is a fragmentary perspective view showing another embodiment of the invention;

Figure 7 is a side elevational view of the clutch showing a further embodiment of the invention; and Figure 8 is a transverse sectional view taken substantially along line 8—8 of Figure 7.

The particular clutches shown and described herein have been designed for use in aircraft control systems, to permit the pilot to overpower the autopilot system in cases of emergency. However, it will be understood that these clutches may readily be adapted for use in other applications.

Turning now to Figures 1 and 2 of the drawings, a clutch is shown in which a first member 10 is rotatably mounted in bearings 11, at either end thereof. A second clutch member 12 is rotatably mounted on shaft 10 and here takes the form of a sleeve, concentric with the shaft and extending therearound. A coil spring 13 is mounted on a circular cylindrical portion 10a of shaft 10 and is in radially stressed engagement therewith. That is, the free inner diameter of spring 13 is smaller than the diameter of cylindrical portion 10a. (To assemble the clutch, the spring is first twisted against the coil thereof, increasing the inner diameter and allowing it to be slipped over the cylindrical portion of member 10.) A pair of lugs 14a and 14b are carried on the inner surface of sleeve 12 and are adapted to engage end surfaces 13a and 13b respectively of the coil spring, providing a driving engagement between the clutch members. For example, if member 12 is rotated in a counterclockwise direction as viewed in Figure 2, lug 14a will engage spring end surface 13a. If a sufficient retarding force is applied to shaft 10 and the torque applied to sleeve 12 is increased, the action of lug 14a on spring 13 will tend to unwind the spring from the shaft or to lift a progressively greater portion of the length thereof from engagement with the shaft, reducing the radial force exerted by the spring on the shaft. When a sufficient amount of the spring has been lifted from the shaft, as determined by the radial stress or "preload" of the spring and the coefficient of friction between the spring and shaft, the spring will slip on the shaft allowing the rotatable clutch members to turn with respect to each other. The torque necessary to cause this action is the "limit torque" discussed above.

If the rotation between the members is in the opposite direction, that is the outer sleeve 12 turning clockwise with respect to the shaft 10, lug 14b will engage end face 13b of the spring with the same resultant action. Of course, either of the clutch members 10 and 12 may drive the other, the action of the clutch being the same in any case. The clutch may readily be connected to other mechanisms as by means of a toothed sleeve 16 keyed to shaft 10 and a toothed flange 17 formed integrally with sleeve 12. It has been found that the slip torque of this clutch is the same for either direction of rotation, and is not affected by lubrication of the clutch surfaces.

The clutch just described operates quite satisfactorily except that there is inherent in it a small amount of backlash between the clutch elements due to the impracticability of forming the lugs 14a and 14b in such a manner that they always engage the end faces 13a and 13b of the spring. Turning now to Figure 3, a modification is shown in which one of the lugs is replaced by an adjustable set screw 20. This set screw is threaded in an opening 21 in the wall of sleeve 12 and is adjusted so that it engages the end surface 13a of spring 13 while at the same time the other end face 13b of the spring is engaged by fixed lug 14. This structure eliminates the objectionable backlash of the clutch of Figures 1 and 2.

It has been found that further tightening of set screw 20 (past the point where it engages the end surface of the spring) will reduce the radial force exerted by spring 13 on cylindrical clutch member 10a enabling adjustment of the limit torque of the clutch. The action of screw 20 may be said to set up a "counter-preload" in spring 13. However, with the structure of Figure 3 the adjustment of the counter-preload is very critical. Turning now to Figure 4 a further modification is shown which facilitates accurate adjustment of the limit torque of the clutch. Here, set screw 20 of Figure 3 is replaced by the combination of a plunger 25, coil spring 26 and adjustable screw 27, all of which are carried in opening 21 in the wall of sleeve 13. Adjustment of set screw 27 varies the force with which plunger 25 engages the end surface 13a of spring 13, while resilient element 26 permits very fine adjustment of this force and thus of the slip torque of the clutch. A similar arrangement including plunger 25b, coil spring 26b and set screw 27b is provided, acting on the end 13b of the spring. Both spring and plunger assemblies need not be adjustable, but the spring constants of both springs 26 and 26b should be the same, in order that the slip torque of the clutch be the same for rotation in both directions.

The structure of Figure 4 reintroduces into the system a certain amount of backlash, which while not as objectionable as that of Figures 1 and 2, still may in some instances be troublesome. The backlash may be eliminated by adding to the structure of Figure 4 a stop member 30 threaded through a bore in adjustment screw 27 and engaging the rear face 25a of plunger 25. In adjusting the clutch of Figure 5 set screw 27 is first advanced compressing spring 26 and urging plunger 25 against the end of clutch spring 13 until the desired slip torque is reached. Stop screw 30 is then inserted and adjusted so as to contact plunger face 23a. Thus, there is no possibility for play in the system due to spring 26.

Turning now to Figure 6, a modified slip clutch will be described. Reference numerals thirty higher than those previously used will be employed to indicate like elements. A closed wound coil spring 43 is mounted in radially stressed engagement on a cylindrical portion of a rotatable clutch member 40 and has end portions 43a and 43b. The second rotatable clutch member 42 has mounted thereon a bracket 65 which has arms 65a and 65b extending longitudinally of the clutch between end portions 43a and 43b of the spring. U-shaped springs 66a and 66b are pivotally carried on portion 65a and 65b of bracket 65 and engage the end portions 43a and 43b of the coil spring, respectively. Set screws 57a and 57b vary the stress set up in springs 66a and 66b and thus the counter-preload applied to coil spring 43. Set screw 60, carried by arm 65a, engages the free end of spring 66a holding it against the end portion 43a of the coil spring, serving as an adjustable stop, preventing backlash. A fixed stop 65b', which is formed integrally with bracket 65, serves the same purpose with end portion 43b of the coil spring.

Turning now to Figures 7 and 8, further modifications of the slip clutch is shown, and here reference numerals sixty higher than those first used will be used to indicate like parts. A first rotatable member 70 is provided with a circular cylindrical portion 70a on which is mounted, in radially stressed engagement, a closed wound coil spring 73. A second rotatable clutch member 72 carries an arm 82 which projects outwardly intermediate the end portions 73a and 73b of the coil spring which are formed into loops. Carried by each loop are discs 83a and 83b respectively. An assembly including a coil spring 84, nut 85 and set screw 86 is mounted between discs 83a and 83b with the head of the set screw projecting through an opening in the disc 83a. Adjustment of set screw 86 varies the counter-preload of spring 73 permitting adjustment of the limit torque of the clutch. Surfaces 82a and 82b at the end of arm 82 are positioned intermediate discs 83a and 83b and adapted for driving engagement therewith. A set screw 87 may be provided in surface 82b to eliminate backlash between the clutch members.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. A slip clutch of the character described, comprising: a first rotatable member; a second rotatable member; a coil spring in radially stressed engagement with one of said members and having end portions; a second spring interposed between the other of said members and one of the ends of said coil spring; means for adjusting the force of said second spring on the end of said coil spring; and means on the other of said members adapted for driving the end portions of said coil spring.

2. A slip clutch of the character described, comprising: a first rotatable member; a second rotatable member; a coil spring in radially stressed engagement with one of said members and having end portions; means; including a resilient element interposed between the other of said members and one of said end portions, for controlling the radial stress in said coil spring; and means on the other of said members adapted for driving the end portions of said spring and including stop means for preventing relative movement between said other member and said spring.

3. A slip clutch of the character described, comprising: a first rotatable member; a second rotatable member; a coil spring in radially stressed engagement with one of said members and having end portions; a second spring interposed between the other of said members and one of the ends of said coil spring; means for adjusting the force of said second spring on the end portion of said coil spring; and means on the other of said members adapted for driving the end portions of said coil spring and including stop means for preventing relative movement between said other member and said coil spring.

References Cited in the file of this patent

UNITED STATES PATENTS

| | | |
|---|---|---|
| 1,126,780 | Jones | Feb. 2, 1915 |
| 1,561,537 | Hayes | Nov. 17, 1925 |
| 2,618,137 | White | Nov. 18, 1952 |